US012077149B2

(12) United States Patent
Iwasaki et al.

(10) Patent No.: US 12,077,149 B2
(45) Date of Patent: Sep. 3, 2024

(54) CONTROL METHOD FOR SERIES HYBRID VEHICLE AND CONTROL DEVICE FOR SERIES HYBRID VEHICLE

(71) Applicant: Nissan Motor Co., Ltd., Yokohama (JP)

(72) Inventors: Kazuma Iwasaki, Kanagawa (JP);
Azusa Kobayashi, Kanagawa (JP);
Hidekatsu Akiyama, Kanagawa (JP);
Hirofumi Miyauchi, Kanagawa (JP);
Ryo Onogawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/277,894

(22) PCT Filed: Feb. 19, 2021

(86) PCT No.: PCT/JP2021/006471
§ 371 (c)(1),
(2) Date: Aug. 18, 2023

(87) PCT Pub. No.: WO2022/176173
PCT Pub. Date: Aug. 25, 2022

(65) Prior Publication Data
US 2024/0132050 A1   Apr. 25, 2024
US 2024/0227777 A9   Jul. 11, 2024

(51) Int. Cl.
*B60W 20/40* (2016.01)
*B60W 20/11* (2016.01)
(Continued)

(52) U.S. Cl.
CPC ............ *B60W 20/40* (2013.01); *B60W 20/11* (2016.01); *B60W 20/13* (2016.01); *B60W 20/15* (2016.01);
(Continued)

(58) Field of Classification Search
CPC ...... B60W 10/06; B60W 20/10; B60W 20/11; B60W 20/13; B60W 20/15; B60W 20/40;
(Continued)

(56) References Cited

U.S. PATENT DOCUMENTS 5,789,881 A * 8/1998 Egami ................... B60W 20/00
180/65.245
6,215,198 B1   4/2001 Nada et al.
(Continued)

FOREIGN PATENT DOCUMENTS

JP   H10-14296 A    1/1998
JP   2006-315488 A  11/2006
(Continued)

*Primary Examiner* — Jeffrey J Restifo
(74) *Attorney, Agent, or Firm* — Young Basile Hanlon & MacFarlane, P.C.

(57) ABSTRACT

A vehicle is a series hybrid vehicle that drives drive wheels using a travel motor by utilizing power of a power generation motor, which generates power by being driven by motive power of an internal combustion engine provided with a turbo charger. A method for controlling the vehicle includes executing a fuel cut of the internal combustion engine when excess power is greater than at least power that can be inputted in the system and the internal combustion engine is being supercharged.

10 Claims, 7 Drawing Sheets

(51) Int. Cl.
*B60W 20/13* (2016.01)
*B60W 20/15* (2016.01)

(52) U.S. Cl.
CPC ............... *B60W 2510/0633* (2013.01); *B60W 2510/0657* (2013.01)

(58) Field of Classification Search
CPC .. B60W 2510/0657; B60W 2510/0633; B60K 6/46
See application file for complete search history.

(56) References Cited

U.S. PATENT DOCUMENTS

| | | | | |
|---|---|---|---|---|
| 6,908,413 | B2* | 6/2005 | Ayabe | B60W 10/04 477/109 |
| 7,599,786 | B2* | 10/2009 | Utsumi | B60W 10/06 477/3 |
| 9,199,637 | B1* | 12/2015 | Kim | B60W 10/08 |
| 9,534,687 | B2* | 1/2017 | Onozato | B60W 10/06 |
| 9,638,096 | B2 | 5/2017 | Kamijo et al. | |
| 9,944,270 | B2* | 4/2018 | Nawata | B60K 6/46 |
| 10,576,978 | B2* | 3/2020 | Borhan | F02D 29/02 |
| 10,661,782 | B2* | 5/2020 | Oguma | B60L 7/16 |
| 11,143,127 | B2* | 10/2021 | Kuroda | F02D 41/024 |
| 11,333,063 | B2* | 5/2022 | Tabata | F02D 31/006 |
| 11,338,790 | B2* | 5/2022 | Tabata | B60K 6/387 |
| 11,377,091 | B2* | 7/2022 | Matsubara | B60W 20/40 |
| 11,454,182 | B2* | 9/2022 | Sugimoto | F02D 41/0245 |
| 11,623,634 | B2* | 4/2023 | Nose | F02D 41/1497 701/22 |
| 11,731,607 | B2* | 8/2023 | Ariyoshi | B60W 20/13 701/22 |
| 11,866,049 | B1* | 1/2024 | LaRoche | B60W 30/19 |
| 11,904,834 | B2* | 2/2024 | Amano | B60W 10/08 |
| 2008/0276913 | A1 | 11/2008 | Zubeck | |
| 2012/0016549 | A1 | 1/2012 | Katsumata et al. | |
| 2012/0089309 | A1* | 4/2012 | Kim | F02D 41/123 701/58 |
| 2016/0251011 | A1* | 9/2016 | Hata | B60W 20/00 701/22 |
| 2019/0368458 | A1 | 12/2019 | Chen et al. | |
| 2022/0306082 | A1* | 9/2022 | Fukao | F02D 41/045 |
| 2023/0227020 | A1* | 7/2023 | Akiyama | B60K 6/46 701/22 |

FOREIGN PATENT DOCUMENTS

| | | |
|---|---|---|
| JP | 2008-094238 A | 4/2008 |
| JP | 2011-10535 A | 1/2011 |
| JP | 2015-182725 A | 10/2015 |
| JP | 2016-117312 A | 6/2016 |
| JP | 5949906 B2 | 7/2016 |
| WO | 2020149100 A1 | 7/2020 |
| WO | 2021/001669 A1 | 1/2021 |

* cited by examiner

CONTROL METHOD FOR SERIES HYBRID VEHICLE AND CONTROL DEVICE FOR SERIES HYBRID VEHICLE

TECHNICAL FIELD

The present invention relates to control of a series hybrid vehicle.

BACKGROUND ART

JP2015-182725A discloses a hybrid vehicle using at least one of an internal combustion engine provided with a turbocharger and an electric motor as a drive source. JP5949906B discloses a hybrid vehicle in which a motor and an internal combustion engine provided with a supercharger such as a turbocharger are mounted as prime movers, and a boost pressure of the internal combustion engine is adjusted by a variable boost pressure mechanism.

SUMMARY OF INVENTION

In an engine with a supercharger, a response delay of an engine torque (boost pressure) delays a decrease in an actual engine torque, and the actual engine torque may become larger than an indicated engine torque. Therefore, in a series hybrid vehicle having an engine with a supercharger, even though electric power generated by an electric power generation motor needs to be reduced, a decrease in an engine torque may be delayed due to a response delay. The need to reduce the generated electric power may arise, for example, in response to a reduction in electric power consumed by driving of a travel motor as a foot is released from an accelerator pedal.

If the decrease in the engine torque is delayed, the decrease in the electric power generated by the electric power generation motor driven by power of the engine is also delayed. Therefore, in this case, a situation may arise in which the electric power generated by the electric power generation motor does not fall within a range of system receivable electric power of a series hybrid system.

However, the electric power generation motor cannot generate the electric power in a range exceeding the system receivable electric power. Therefore, in this case, there is a possibility that an abrupt increase in an engine revolution due to an engine torque with an amount that cannot be converted into the electric power generated within the range of the system receivable electric power.

The present invention has been made in view of such problems, and thus, an object of the present invention is to prevent an abrupt increase in an engine revolution in a series hybrid vehicle having an engine with a supercharger.

A control method for a series hybrid vehicle according to one embodiment of the present invention is a control method for a series hybrid vehicle in which a drive wheel is driven by a travel motor using an electric power of an electric power generation motor which is driven by power of an engine with a supercharger to generate the electric power, the control method comprising: performing fuel cut of the engine if an excess amount of a torque of the engine over a drive engine torque of the electric power generation motor is greater than exceeds at least the drive engine torque of the electric power generation motor corresponding to system receivable electric power indicating an electric power reception margin of a series hybrid system provided in the series hybrid vehicle, and the engine is supercharged.

A control method for a series hybrid vehicle according to another embodiment of the present invention is a control method for a series hybrid vehicle in which a drive wheel is driven by a travel motor using electric power of an electric power generation motor which is driven by power of an engine with a supercharger to generate the electric power, the control method comprising: performing fuel cut of the engine if magnitude of a difference between a value obtained by converting power of an internal combustion engine into the electric power of the electric power generation motor and a value obtained by converting the power of the engine capable of being received by the electric power generation motor into the electric power of the electric power generation motor exceeds at least system receivable electric power indicating an electric power reception margin of a series hybrid system provided in the series hybrid vehicle, and the engine is supercharged.

According to further another embodiment of the present invention, a control device for a series hybrid vehicle corresponding to the above-described control method for the series hybrid vehicle is provided.

DESCRIPTION OF EMBODIMENTS

Embodiments of the present invention will be described below with reference to the accompanying drawings.

Figure 1:
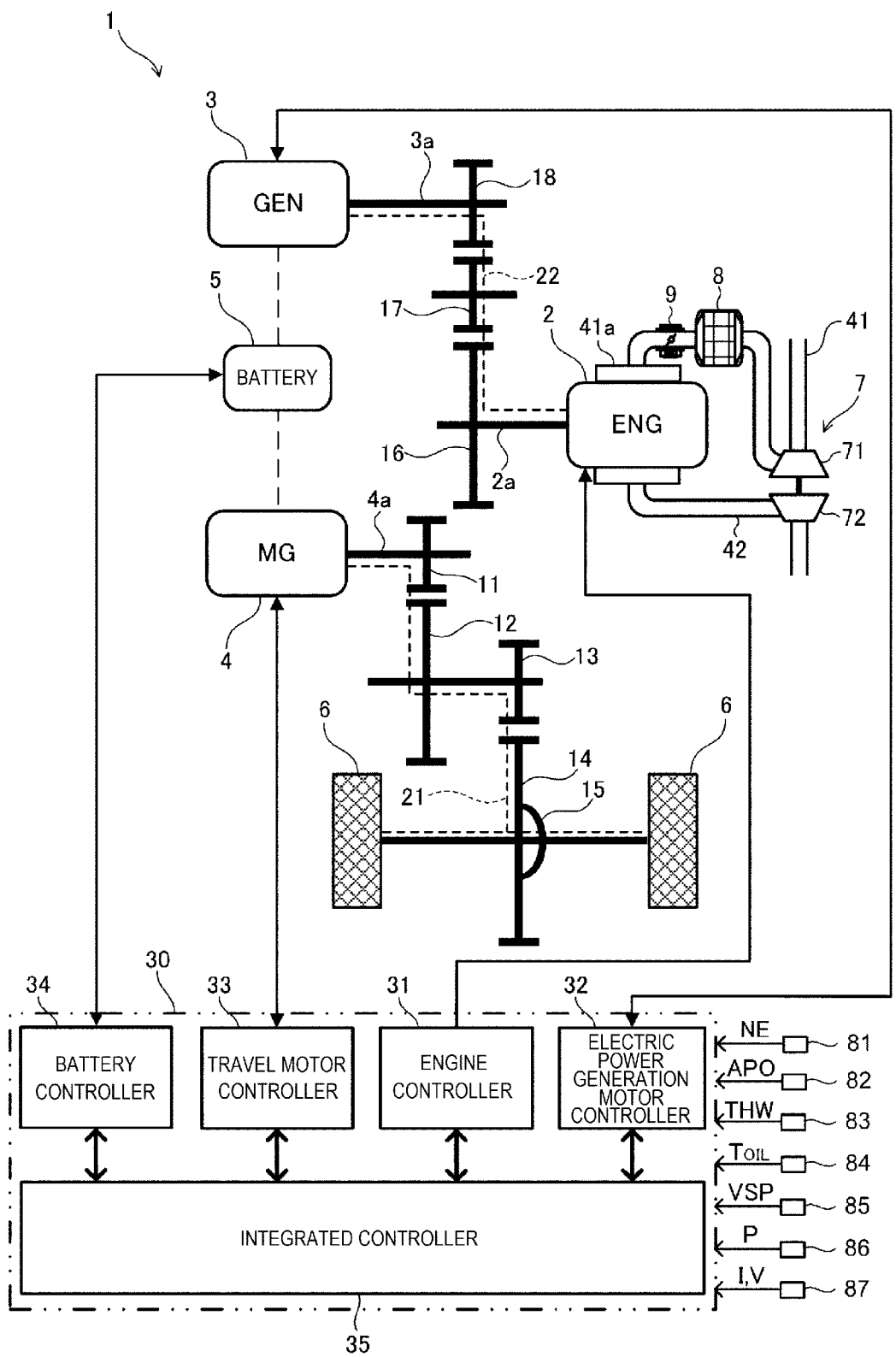
FIG. 1 is a schematic configuration diagram showing a main part of a vehicle.

FIG. 1 is a schematic configuration diagram showing a main part of a vehicle 1. The vehicle 1 includes an internal combustion engine 2, an electric power generation motor 3, a travel motor 4, a battery 5, drive wheels 6, a turbocharger 7, an intercooler 8, and a throttle valve 9.

The internal combustion engine 2 may be a gasoline engine or a diesel engine. The internal combustion engine 2 is an engine with a supercharger, and the turbocharger 7 is provided as the supercharger. The turbocharger 7 includes a compressor 71 and a turbine 72. The compressor 71 is provided in an intake passage 41 of the internal combustion engine 2, and the turbine 72 is provided in an exhaust passage 42 of the internal combustion engine 2. In the turbocharger 7, the turbine 72 rotates due to exhaust gas, so that the compressor 71 rotates via a shaft to compress intake air.

The intake air compressed by the compressor 71 passes through the intercooler 8, the throttle valve 9, and an intake manifold 41a of the intake passage 41 in this order and is supplied to the internal combustion engine 2. The intercooler 8 cools the supercharged intake air, and the throttle valve 9 regulates an amount of the intake air. The intake manifold 41a distributes the intake air to each cylinder of the internal combustion engine 2.

The electric power generation motor 3 is driven by power of the internal combustion engine 2 to generate electric power. The travel motor 4 is driven by electric power of the battery 5 to drive the drive wheels 6. The travel motor 4 also has a so-called regeneration function of being rotated together with rotation of the drive wheels 6 during deceleration or the like to regenerate a deceleration energy as electric power. The battery 5 is charged with the electric power generated by the electric power generation motor 3 and the electric power regenerated by the travel motor 4.

The vehicle 1 includes a first power transmission path 21 and a second power transmission path 22. The first power transmission path 21 transmits power between the travel motor 4 and the drive wheels 6. The second power transmission path 22 transmits power between the internal combustion engine 2 and the electric power generation motor 3. The first power transmission path 21 and the second power transmission path 22 are power transmission paths independent of each other, that is, power transmission paths in which power is not transmitted from one of the first power transmission path 21 and the second power transmission path 22 to the other.

The first power transmission path 21 includes a first reduction gear 11 provided on a rotation shaft 4a of the travel motor 4, a second reduction gear 12 meshing with the first reduction gear 11, a third reduction gear 13 provided coaxially with the second reduction gear 12 and meshing with a differential gear 14, and the differential gear 14 provided in a differential case 15.

The second power transmission path 22 includes a fourth reduction gear 16 provided on an output shaft 2a of the internal combustion engine 2, a fifth reduction gear 17 meshing with the fourth reduction gear 16, and a sixth reduction gear 18 provided on a rotation shaft 3a of the electric power generation motor 3 and meshing with the fifth reduction gear 17.

Each of the first power transmission path 21 and the second power transmission path 22 does not include an element that blocks power transmission. That is, each of the first power transmission path 21 and the second power transmission path 22 is always in a state in which the power is transmitted.

The vehicle 1 further includes a controller 30. The controller 30 includes an engine controller 31 that controls the internal combustion engine 2, an electric power generation motor controller 32 that controls the electric power generation motor 3, a travel motor controller 33 that controls the travel motor 4, a battery controller 34 that controls the battery 5, and an integrated controller 35 that integrates control of the vehicle 1.

The engine controller 31 is implemented by a microcomputer including a central processing unit (CPU), a read-only memory (ROM), a random access memory (RAM), and an input/output interface (I/O interface). The same applies to other controllers. The engine controller 31, the electric power generation motor controller 32, the travel motor controller 33, and battery controller 34 are communicably connected to each other via the integrated controller 35 using a CAN standard bus.

The controller 30 receives signals from various sensors and switches including a revolution speed sensor 81 for detecting a revolution speed $N_{ICE}$ of the internal combustion engine 2, an accelerator opening sensor 82 for detecting an accelerator opening APO indicating a depression amount of an accelerator pedal, a water temperature sensor 83 for detecting a water temperature THW of the internal combustion engine 2, an oil temperature sensor 84 for detecting an oil temperature $T_{OIL}$ of the internal combustion engine 2, a vehicle speed sensor 85 for detecting a vehicle speed VSP, a pressure sensor 86 for detecting an intake pressure P, and a current and voltage sensor 87 for detecting a current I and an applied voltage V of an auxiliary machine that consumes the electric power, such as an air conditioner and an electric power steering device. These signals are input to the integrated controller 35 directly or via another controller such as the engine controller 31. The pressure sensor 86 is provided in the intake passage 41 at a position where a boost pressure of the internal combustion engine 2 can be detected, and is provided in the intake manifold 41a in the present embodiment. The current and voltage sensor 87 may be implemented by a plurality of sensors, and may include a plurality of sensors provided for each auxiliary machine. Signals such as rotation speed, torque, and state of charge (SOC) which is a parameter indicating a state of charge of the battery 5 are input to the controller 30 from the electric power generation motor 3, the travel motor 4, and the battery 5 as well.

The vehicle 1 is a series hybrid vehicle in which the drive wheels 6 are driven by the travel motor 4 using the electric power of the electric power generation motor 3 that is driven by the power of the internal combustion engine 2 to generate the electric power. The controller 30 configures a series hybrid system together with the internal combustion engine 2, the electric power generation motor 3, the travel motor 4, the battery 5, and auxiliary machines.

As described above, the internal combustion engine 2 is an engine with a supercharger. In such an internal combustion engine 2, an actual torque $TQ_{ICE\_A}$ of the internal combustion engine 2 may become larger than an indicated torque $TQ_{ICE\_T}$ due to a response delay of the torque $TQ_{ICE}$ (boost pressure). Therefore, in the vehicle 1 provided with the internal combustion engine 2, even though the generated electric power needs to be reduced, a decrease in the torque $TQ_{ICE}$ may be delayed due to the response delay. The need to reduce the generated electric power may arise, for example, in response to a reduction in the electric power consumed by driving of the travel motor 4 as a foot is released from an accelerator pedal.

If the decrease in the torque $TQ_{ICE}$ is delayed, the decrease in the electric power generated by the electric power generation motor 3 driven by the power of the internal combustion engine 2 is also delayed. Therefore, in this case, a situation may arise in which the electric power generated by the electric power generation motor 3 does not fall within a range of system receivable electric power EP_SYS of the series hybrid system.

However, the electric power generation motor 3 cannot generate the electric power in a range exceeding the system receivable electric power EP_SYS. Therefore, in this case, there is a concern that an abrupt increase in an engine revolution due to the torque $TQ_{ICE}$ with an amount that cannot be converted into the electric power generated within the range of the system receivable electric power EP_SYS.

In particular, when the foot releases from the accelerator pedal, the electric power consumed by driving of the travel motor 4 decreases as usual, while the electric power generated by the electric power generation motor 3 is less likely to decrease. As a result, the system receivable electric power EP_SYS is reduced, and the abrupt increase is likely to occur.

In the present embodiment, a mechanism for quickly lowering a boost pressure of a recirculation valve or the like that returns the compressed intake air from a downstream side to an upstream side of the compressor 71 is not provided. Therefore, the boost pressure cannot be lowered using such a mechanism, and the response delay of the torque $TQ_{ICE}$ with respect to the decrease in the indicated torque $TQ_{ICE\_T}$ is likely to increase.

In view of such circumstances, in the present embodiment, the integrated controller 35 is implemented as described below.

Figure 2:
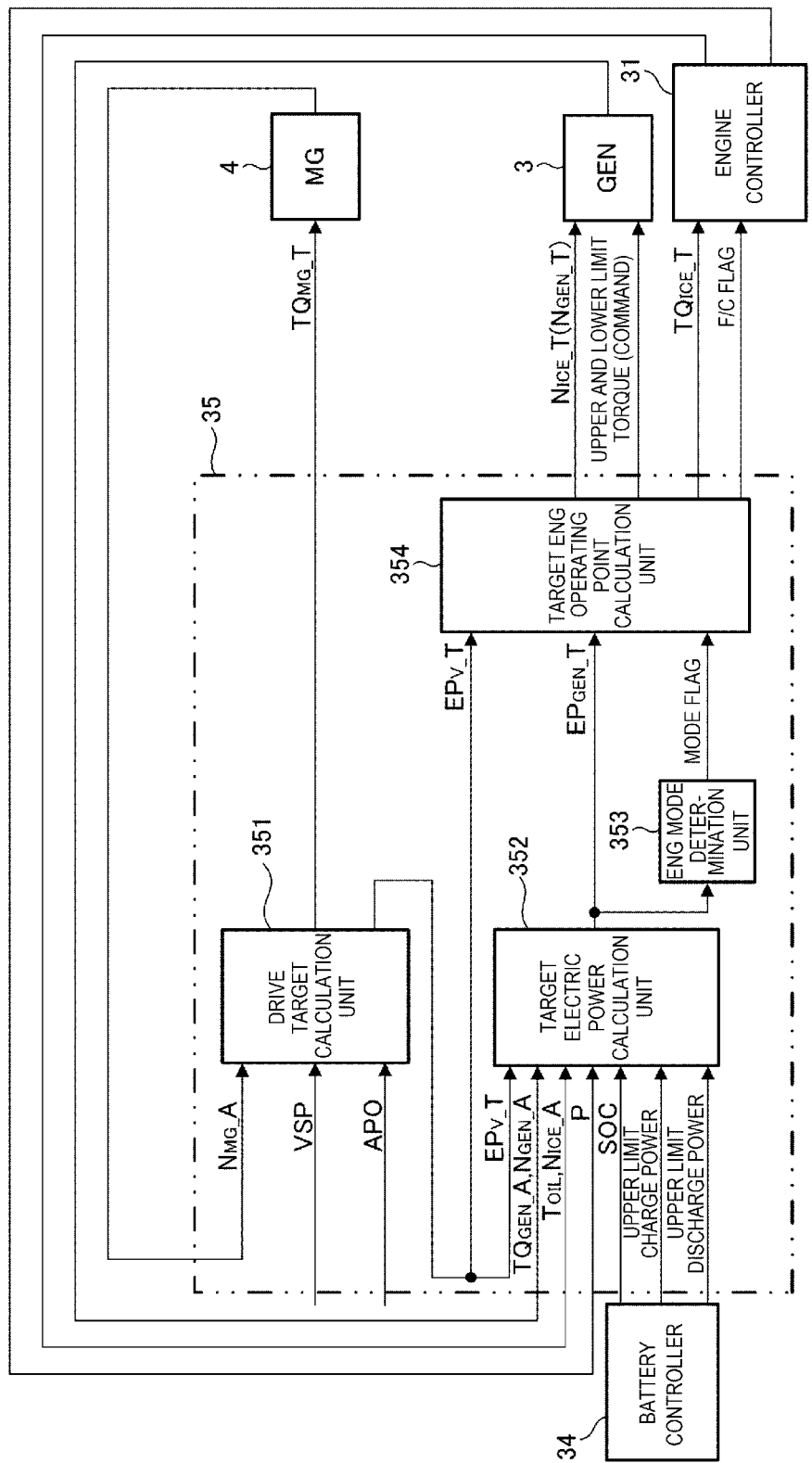
FIG. 2 is a functional block diagram showing processing executed by an integrated controller.

FIG. 2 is a functional block diagram showing processing executed by the integrated controller 35. The integrated controller 35 includes a drive target calculation unit 351, a target electric power calculation unit 352, an ENG mode determination unit 353, and a target ENG operating point calculation unit 354.

The drive target calculation unit 351 calculates a target torque $TQ_{MG\_T}$ of the travel motor 4. The target torque $TQ_{MG\_T}$ is calculated based on an actual rotation speed $N_{MG\_A}$ of the travel motor 4 and a target driving force. The target torque $TQ_{MG\_T}$ is calculated as follows.

That is, first, the target driving force is calculated based on the vehicle speed VSP and the accelerator opening APO. The target driving force is set in advance according to the vehicle speed VSP and the accelerator opening APO. The calculated target driving force is converted into a torque of the rotation shaft 4a of the travel motor 4 using a gear ratio set in the first power transmission path 21 and a tire diameter of the drive wheels 6, and the converted torque is calculated as the target torque $TQ_{MG\_T}$. Furthermore, the actual rotation speed $N_{MG\_A}$ is used to calculate a maximum torque of the travel motor 4 in an absolute value, and the maximum torque of the travel motor 4 in the absolute value is set as upper and lower limits of the target torque $TQ_{MG\_T}$. The target driving force becomes a negative value, that is, a target regenerative power when the travel motor 4 performs regeneration. The calculated target torque $TQ_{MG\_T}$ is input to the travel motor 4.

The drive target calculation unit 351 further calculates vehicle required electric power $EP_{V\_T}$. The vehicle required electric power $EP_{V\_T}$ is electric power required for the vehicle 1 according to the target driving force of the travel motor 4 and is calculated based on the target driving force of the travel motor 4. The calculated vehicle required electric power $EP_{V\_T}$ is input to target electric power calculation unit 352 and the target ENG operating point calculation unit 354.

The target electric power calculation unit 352 calculates, based on the vehicle required electric power $EP_{V\_T}$, target electric power $EP_{GEN\_T}$ for electric power generation or discharge by the electric power generation motor 3. In the electric power generation, the internal combustion engine 2 drives the electric power generation motor 3. When positive vehicle required electric power $EP_{V\_T}$ is input, a target generated electric power is calculated with an upper limit charge power as an upper limit. An upper limit discharge power is used to limit negative vehicle required electric power $EP_{V\_T}$ in absolute value. The upper limit charge power and the upper limit discharge power together with SOC are input from the battery controller 34 to the target electric power calculation unit 352. SOC is used for calculation of the system receivable electric power EP_SYS which will be described later.

Further, the intake pressure P, and the oil temperature $T_{OIL}$ and an actual revolution speed $N_{ICE\_A}$ of the internal combustion engine 2 are input from the engine controller 31 to the target electric power calculation unit 352. The intake pressure P is used for processing in an abrupt increase pre-detection unit 352a which will be described later. The oil temperature $T_{OIL}$ and the actual revolution speed $N_{ICE\_A}$ are used to calculate overflow electric power EP_OVER described below.

Figure 3:
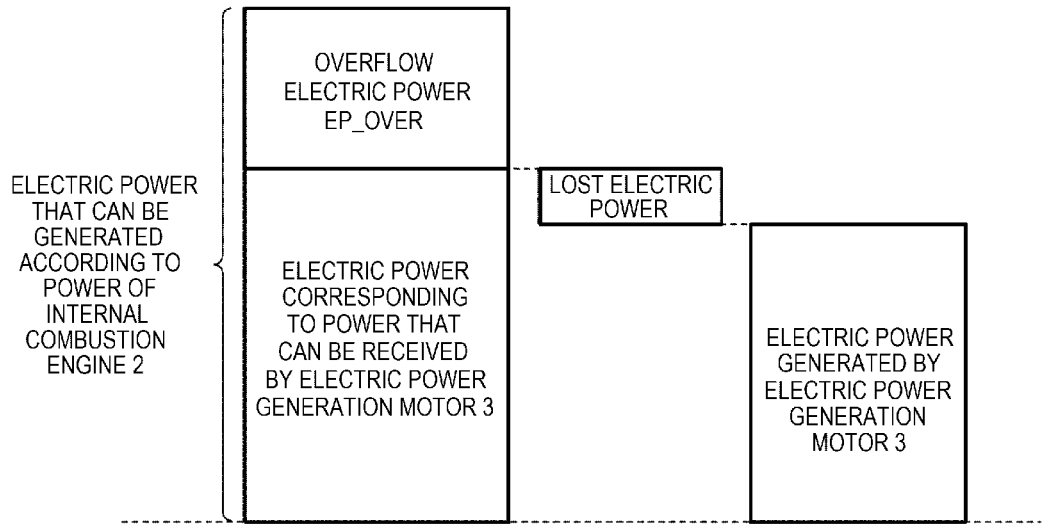
FIG. 3 is an explanatory diagram of overflow electric power.

FIG. 3 is an explanatory diagram of the overflow electric power EP_OVER. Electric power that can be generated according to the power of the internal combustion engine 2 (hereinafter, also simply referred to as the generatable power) is a value obtained by converting the power of the internal combustion engine 2 into the electric power of the electric power generation motor 3, and an excess amount of the generatable power that does not fall within the range of the system receivable electric power EP_SYS cannot be generated by the electric power generation motor 3. The generatable power includes electric power corresponding to receivable power of the electric power generation motor 3 and the overflow electric power EP_OVER.

The electric power corresponding to the receivable power of the electric power generation motor 3 is a value obtained by converting the power of the internal combustion engine 2 which can be received by the electric power generation motor 3 into the electric power of the electric power generation motor 3, and is obtained by converting the power of the internal combustion engine 2 which can be received by the electric power generation motor 3 to the maximum. This electric power includes the electric power generated by the electric power generation motor 3 and a lost electric power. The overflow electric power EP_OVER is the excess amount of the generatable power that exceeds the electric power corresponding to the receivable power of the electric power generation motor 3. Therefore, the overflow electric power EP_OVER is implemented by magnitude of a difference between the generatable power and the electric power corresponding to the receivable power of the electric power generation motor 3.

For example, when the response delay of the torque $TQ_{ICE}$ of the internal combustion engine 2 causes the actual torque $TQ_{ICE\_A}$ to be larger than the indicated torque $TQ_{ICE\_T}$, the generatable power exceeds the electric power corresponding to the receivable power of the electric power generation motor 3. Such overflow electric power EP_OVER means electric power to overcome a friction torque of the internal combustion engine 2 and an inertia torque for canceling a change in the revolution speed $N_{ICE}$ of the internal combustion engine 2. Therefore, the overflow electric power EP_OVER can be calculated based on a sum of magnitude of these torques. The friction torque is set in advance according to the oil temperature $T_{OIL}$ and the actual revolution speed $N_{ICE\_A}$, and is calculated based on the oil temperature $T_{OIL}$ and the actual revolution speed $N_{ICE\_A}$. The water temperature THW may be used instead of the oil temperature Tom. The inertia torque is calculated by a relational expression of inertia torque=angular acceleration× moment of inertia. The angular acceleration can be obtained by dividing, by a calculation cycle, a difference between a current value and a previous value of the revolution speed $N_{ICE}$ obtained in each calculation cycle. A moment of inertia of a power transmission system forming the second power transmission path 22 is used as the moment of inertia.

Returning to FIG. 2, an actual torque $TQ_{GEN\_A}$ and an actual rotation speed $N_{GEN\_A}$ from the electric power generation motor 3 are further input to the target electric power calculation unit 352. The actual torque $TQ_{GEN\_A}$ and the actual rotation speed $N_{GEN\_A}$ are used to calculate the electric power generated by the electric power generation motor 3. The calculated electric power generated by the electric power generation motor 3 is used for calculation of the system receivable electric power EP_SYS as described below.

Figure 4:
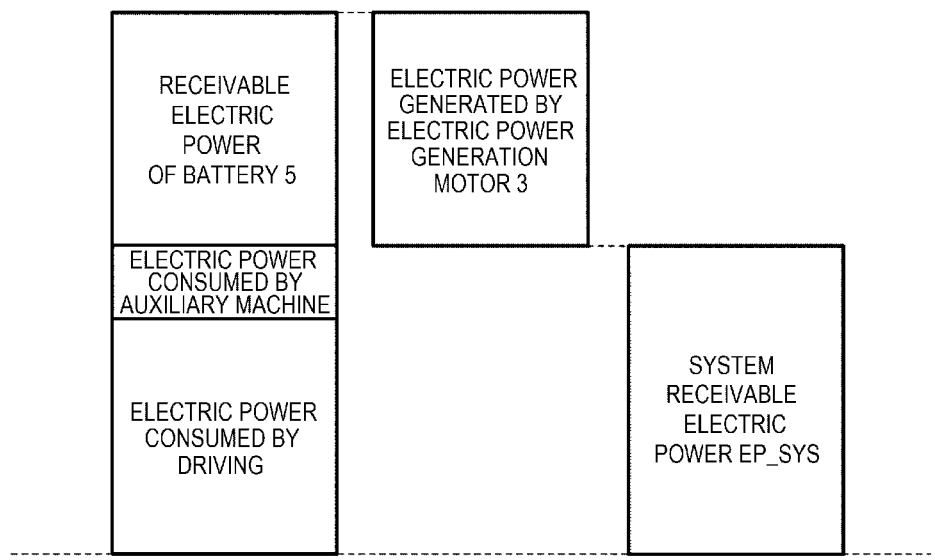
FIG. 4 is an explanatory diagram of system receivable electric power.

FIG. 4 is an explanatory diagram of the system receivable electric power EP_SYS. The system receivable electric power EP_SYS is a value indicating electric power reception margin of the series hybrid system, and is obtained by subtracting magnitude of the electric power generated by the electric power generation motor 3 from a sum of magnitude of receivable electric power of the battery 5, electric power consumed by auxiliary machine, and the electric power consumed by driving. The receivable electric power of the battery 5 is calculated based on SOC. The electric power consumed by auxiliary machine is calculated based on a signal from the current and voltage sensor 87. The vehicle required electric power $EP_{V\_T}$ is used as the electric power consumed by driving.

The target electric power $EP_{GEN\_T}$ is input from the target electric power calculation unit 352 shown in FIG. 2 to the ENG mode determination unit 353 and the target ENG operating point calculation unit 354. The ENG mode determination unit 353 determines an operating mode of the internal combustion engine 2 based on the target electric power $EP_{GEN\_T}$. The operating mode include a driving force required electric power generation mode which is an electric power generation mode in which the electric power is generated in response to a vehicle driving force request. When the operating mode is determined to be the driving force required electric power generation mode, a signal of a mode flag is input to the target ENG operating point calculation unit 354 as a signal of a vehicle driving force request flag.

The target ENG operating point calculation unit 354 calculates a target operating point of the internal combustion engine 2 based on the target electric power $EP_{GEN\_T}$. The target operating point can be set in advance according to the target electric power $EP_{GEN\_T}$. When a positive target electric power $EP_{GEN\_T}$, that is, a target generated electric power is input, a target revolution speed $N_{ICE\_T}$ and the indicated torque $TQ_{ICE\_T}$ of the internal combustion engine 2 corresponding to the target generated electric power are calculated as the target operating point. The calculated target revolution speed $N_{ICE\_T}$ is input to the electric power generation motor 3, and is used to control the electric power generation motor 3. The target revolution speed $N_{ICE\_T}$ may be converted into a target rotation speed $N_{GEN\_T}$ of the electric power generation motor 3 by a gear ratio. A command value for the upper and lower limit torque of the electric power generation motor 3 is also input to the electric power generation motor 3. The command value is set in advance according to the vehicle required electric power $EP_{V\_T}$. The calculated indicated torque $TQ_{ICE\_T}$ is input to the engine controller 31 and is used to control the internal combustion engine 2. A signal of a fuel cut (F/C) flag is also input to the engine controller 31. The F/C flag is set as follows.

Figure 5:
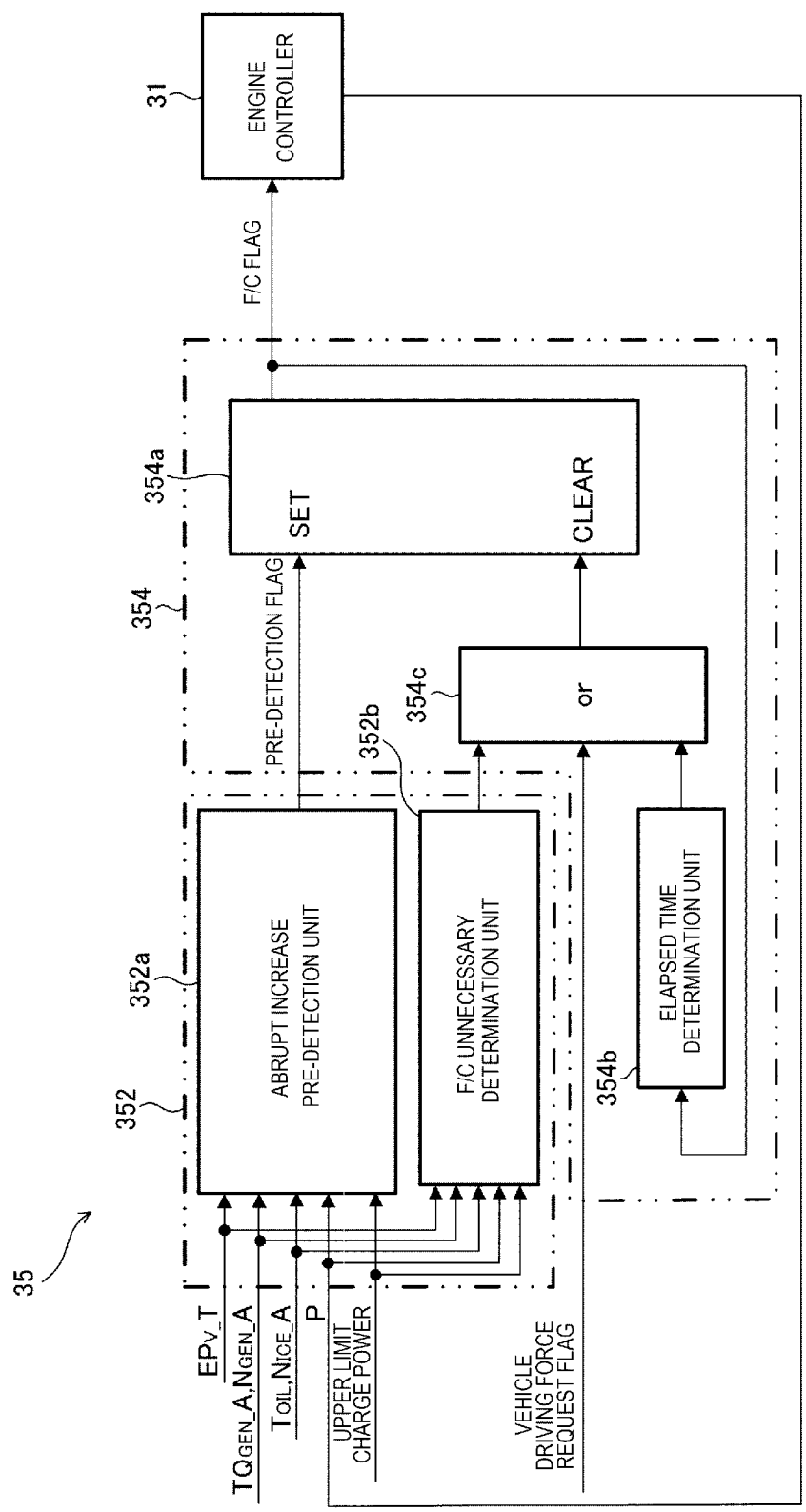
FIG. 5 is a functional block diagram of a main part of processing executed by the integrated controller.

FIG. 5 is a functional block diagram of a main part of processing executed by the integrated controller 35. The target electric power calculation unit 352 includes the abrupt increase pre-detection unit 352a and an F/C unnecessary determination unit 352b. The target ENG operating point calculation unit 354 includes an F/C flag setting unit 354a, an elapsed time determination unit 354b, and a setting clear indication unit 354c. Various signals including the intake pressure P are input to the abrupt increase pre-detection unit 352a. These signals are also input to the F/C unnecessary determination unit 352b. The shown various signals other than the intake pressure P are used for the calculation of the overflow electric power EP_OVER, the calculation of the system receivable electric power EP_SYS, and limitation of the vehicle required electric power $EP_{V\_T}$.

The abrupt increase pre-detection unit 352a detects in advance an abrupt increase in the engine revolution. A pre-detection condition is that the overflow electric power EP_OVER is larger than the system receivable electric power EP_SYS and that the internal combustion engine 2 is supercharged. When the intake pressure P is equal to or larger than a predetermined value P1, it is determined that the internal combustion engine 2 is supercharged. The predetermined value P1 can be set in advance to a value equal to or larger than an atmospheric pressure. If the pre-detection condition is satisfied, an ON signal of a pre-detection flag is input to the F/C flag setting unit 354a.

The F/C unnecessary determination unit 352b determines whether fuel cut is unnecessary. An F/C unnecessary condition is that the overflow electric power EP_OVER is smaller than the system receivable electric power EP_SYS and that the internal combustion engine 2 is not supercharged. When the intake pressure P is equal to or less than a predetermined value P2, it is determined that the internal combustion engine 2 is not supercharged. The predetermined value P2 can be set in advance to a value less than the atmospheric pressure. If the F/C unnecessary condition is satisfied, an F/C unnecessary signal is input to the setting clear indication unit 354c.

The F/C flag setting unit 354a sets the F/C flag to ON when the ON signal of the pre-detection flag is input. The ON signal of the F/C flag is input to the engine controller 31, whereby the fuel cut of the internal combustion engine 2 is performed. The ON signal of the F/C flag is also input to the elapsed time determination unit 354b.

Based on the ON signal of the F/C flag, the elapsed time determination unit 354b determines whether a predetermined time has elapsed since the fuel cut was started. The predetermined time is a timeout time for the fuel cut, and is set in advance by experiments or the like. When the predetermined time has elapsed since the fuel cut was started, an elapse completion signal is input to the setting clear indication unit 354c.

The setting clear indication unit 354c inputs a setting clear signal of the F/C flag to the F/C flag setting unit 354a when the F/C unnecessary signal, the ON signal of the vehicle driving force request flag, or the elapse completion signal is input. The ON signal of the vehicle driving force request flag is input from the ENG mode determination unit 353 described above to the setting clear indication unit 354c.

The F/C flag setting unit 354a clears the setting of the F/C flag when the setting clear signal is input. Accordingly, the F/C flag is turned off. The engine controller 31 cancels the fuel cut of the internal combustion engine 2 when the ON signal of the F/C flag is no longer input. When the ON signal of the F/C flag is no longer input, the elapsed time determination unit 354b stops time measurement and clears the measured time.

Figure 6:
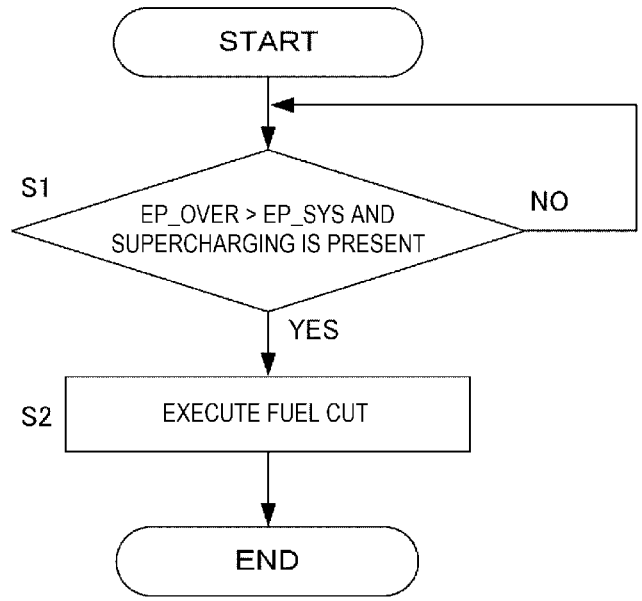
FIG. 6 is a flowchart showing an example of control during execution of F/C.

FIG. 6 is a flowchart showing an example of control performed by the controller 30 during execution of F/C. Processing of step S1 can be performed by the integrated controller 35, and processing of step S2 can be performed by the engine controller 31.

In step S1, the controller 30 determines whether the overflow electric power EP_OVER is larger than the system receivable electric power EP_SYS and whether the internal combustion engine 2 is supercharged. That is, it is determined whether the pre-detection condition described above is satisfied. If the determination in step S1 is negative, the processing returns to step S1, and if the determination in step S1 is positive, the processing proceeds to step S2.

In step S2, the controller 30 executes the fuel cut of the internal combustion engine 2. Accordingly, the torque $TQ_{ICE}$ and the revolution speed $N_{ICE}$ are quickly reduced in advance with respect to the abrupt increase in the engine revolution caused by the response delay of the torque $TQ_{ICE}$. As a result, the abrupt increase in the engine revolution is prevented. Since the internal combustion engine 2 does not transmit the power to the drive wheels 6, a behavior of the vehicle 1 is not affected even if the fuel cut is performed in this manner. After step S2, the processing is temporarily ended.

In step S1, the overflow electric power EP_OVER may be determined as follows.

Figure 7:
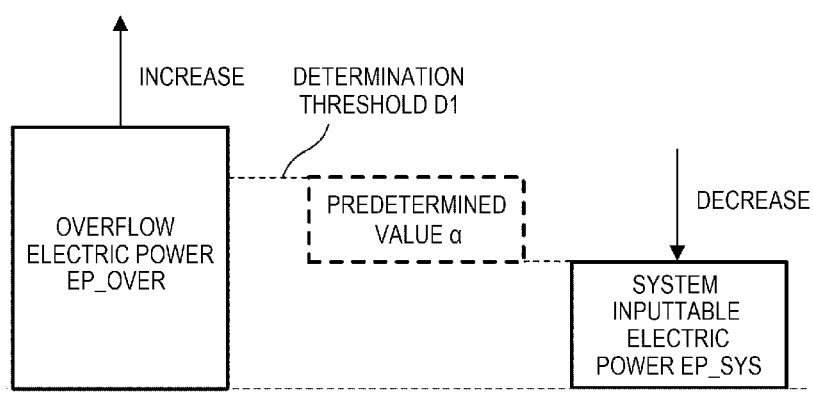
FIG. 7 is a diagram showing a modification of determining the overflow electric power during the execution of F/C.

FIG. 7 is a diagram showing a modification of determining the overflow electric power EP_OVER during the execution of F/C. As shown in FIG. 7, a determination threshold D1 is a sum of the system receivable electric power EP_SYS and a predetermined value $\alpha$. The predetermined value $\alpha$ is a value for adapting a timing for detecting the abrupt increase in the engine revolution in advance to an appropriate timing, and is set in advance by experiments or the like. According to such a determination, it is possible to more appropriately prevent the abrupt increase in the engine revolution by the fuel cut. In this case, the overflow electric power EP_OVER increases and the system receivable electric power EP_SYS decreases, so that the overflow electric power EP_OVER becomes larger than the determination threshold D1.

Figure 8:
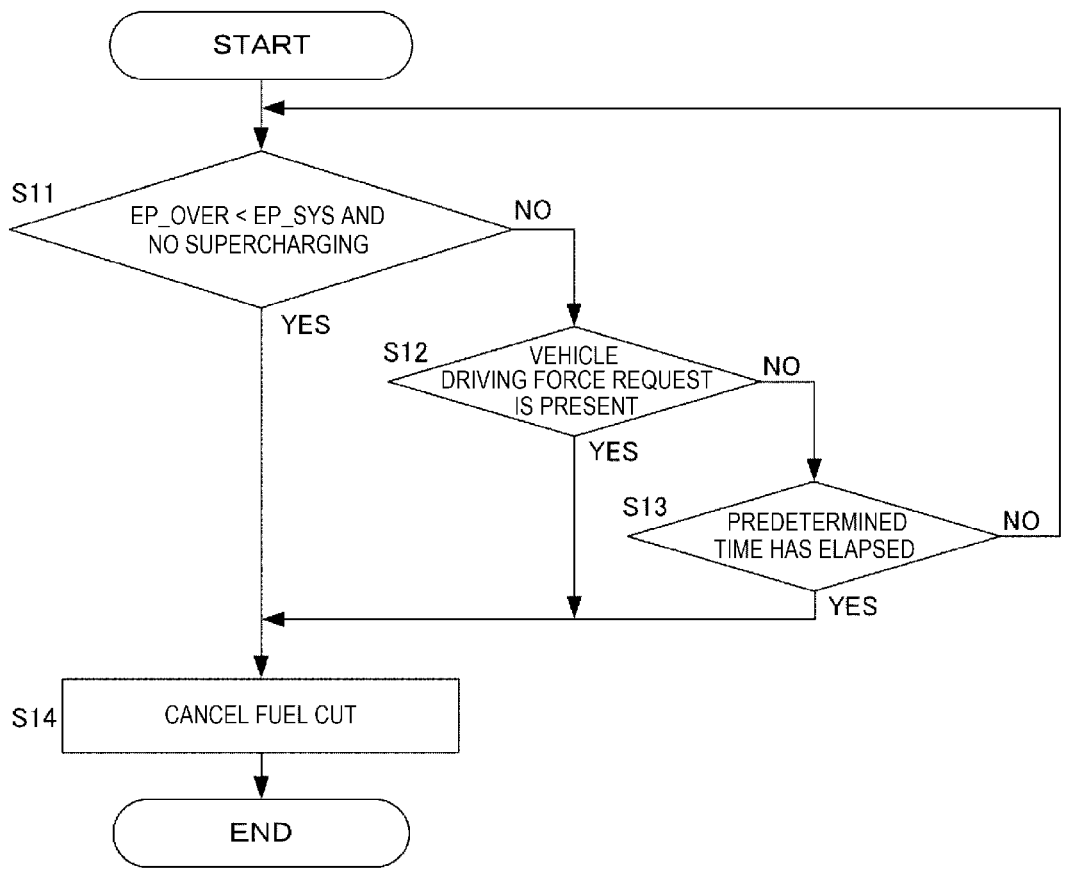
FIG. 8 is a flowchart showing an example of control when F/C is canceled.

FIG. 8 is a flowchart showing an example of control performed by the controller 30 when the F/C is canceled. Processing from step S11 to step S13 can be performed by the integrated controller 35, and processing of step S14 can be performed by the engine controller 31.

In step S11, the controller 30 determines whether the overflow electric power EP_OVER is smaller than the system receivable electric power EP_SYS and whether the internal combustion engine 2 is not supercharged. That is, it is determined whether the F/C unnecessary condition described above is satisfied.

If the determination in step S11 is positive, the processing proceeds to step S14, and the controller 30 cancels the fuel cut. Accordingly, the fuel cut is canceled in response to a matter that the abrupt increase in the engine revolution due to the response delay of the torque $TQ_{ICE}$ does not occur. After step S14, the processing ends temporarily.

If the determination in step S11 is negative, the processing proceeds to step S12, and the controller 30 determines whether the vehicle driving force request is present. Whether the vehicle driving force request is present can be determined based on the signal of the vehicle driving force request flag. If the determination in step S12 is positive, the processing proceeds to step S14, and the fuel cut is canceled. As a result, an electric power generation operation of the internal combustion engine 2 is resumed in accordance with the resumption of driving of the travel motor 4.

If the determination in step S12 is negative, the processing proceeds to step S13, and the controller 30 determines whether the predetermined time has elapsed since the fuel cut was started. The predetermined time is determined based on the response delay of the actual torque $TQ_{ICE\_A}$ of the internal combustion engine 2 with respect to the indicated torque $TQ_{ICE\_T}$. This is because if the time has elapsed during which the actual torque $TQ_{ICE\_A}$ sufficiently follows the indicated torque $TQ_{ICE\_T}$, there is a high probability that the overflow electric power EP_OVER will be smaller than the system receivable electric power EP_SYS. If the determination in step S13 is negative, the processing returns to step S11.

If the determination in step S13 is positive, the processing proceeds to step S14, and the fuel cut is canceled. Accordingly, the fuel cut is prevented from being continued more than necessary.

In step S11, satisfaction of at least one of the following conditions may be determined: the overflow electric power EP_OVER is smaller than the system receivable electric power EP_SYS; the internal combustion engine 2 is not supercharged.

If the former condition is satisfied, the series hybrid system has a electric power reception margin. Therefore, in this case, it is possible to resume the electric power generation operation of the internal combustion engine 2 early from a viewpoint of the electric power reception margin.

If the latter condition is satisfied, there is a high probability that the torque $TQ_{ICE}$ of the internal combustion engine 2 decreases to some extent and the overflow electric power EP_OVER is smaller than the system receivable electric power EP_SYS. If the internal combustion engine 2 is not supercharged, the actual torque $TQ_{ICE\_A}$ of the internal combustion engine 2 causes only a response delay within a permissible range with respect to the indicated torque $TQ_{ICE\_T}$, and thus, there is a high probability that the overflow electric power EP_OVER is smaller than the system receivable electric power EP_SYS. Therefore, in this case, by resuming the electric power generation operation of the internal combustion engine 2 before the torque $TQ_{ICE}$ significantly decreases, it is possible to ensure responsiveness of the torque $TQ_{ICE}$.

In step S12, it may be further determined whether the electric power of the electric power generation motor 3 is necessary as an electric power source of the travel motor 4. In this case, the electric power generation operation of the internal combustion engine 2 can be resumed according to necessity of resuming the electric power generation by proceeding to step S14 when the electric power of the electric power generation motor 3 is necessary.

In step S11, the overflow electric power EP_OVER may be determined as follows.

Figure 9:
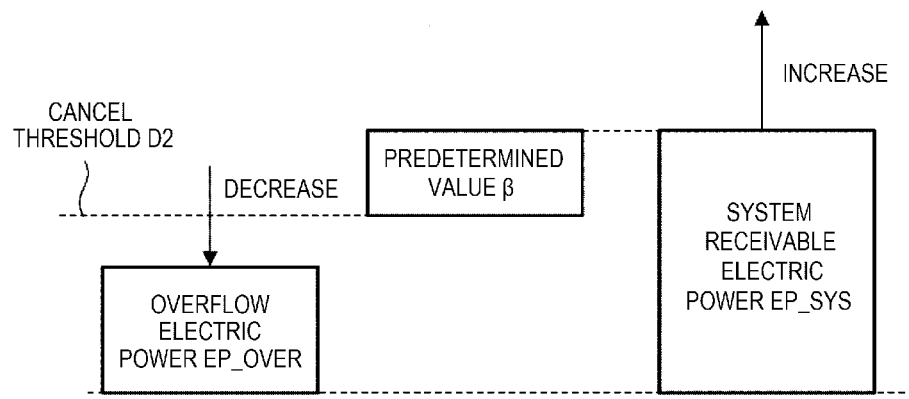
FIG. 9 is a diagram showing a modification of determining the overflow electric power when F/C is canceled.

FIG. 9 is a diagram showing a modification of determining the overflow electric power EP_OVER when F/C is canceled. A cancel threshold D2 is magnitude of a difference between the system receivable electric power EP_SYS and a predetermined value $\beta$. The predetermined value $\beta$ is a value for adapting a timing of canceling the fuel cut to an appropriate timing, and is set in advance by experiments or the like. According to such determination, the unnecessary fuel cut can be canceled more appropriately. In this case, the overflow electric power EP_OVER decreases and the system receivable electric power EP_SYS increases, so that the overflow electric power EP_OVER becomes less than the cancel threshold D2.

The controller 30 includes a control unit by being programmed to perform the processing of the flowcharts shown in FIGS. 6 and 8. The controller 30 as a control unit is programmed to satisfy the functional block diagrams shown in FIGS. 2 and 5.

Figure 10:
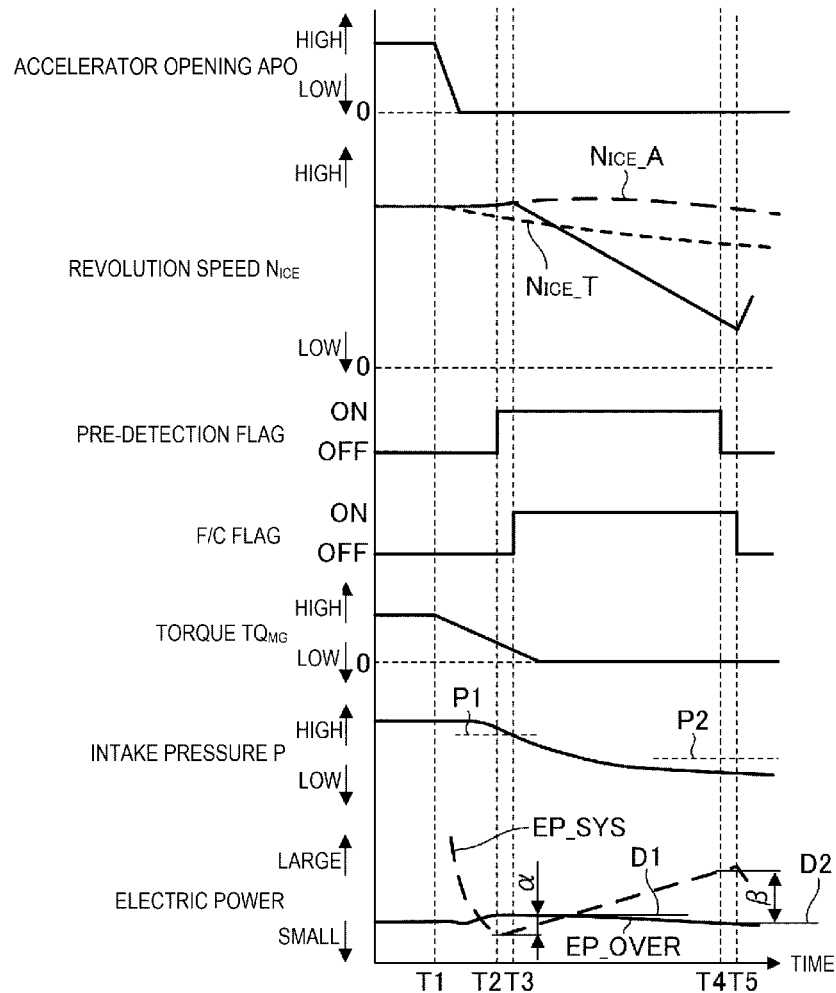
FIG. 10 is a diagram showing an example of a timing chart.

FIG. 10 is a diagram showing an example of a timing chart corresponding to control performed by the controller 30. FIG. 10 shows a case where the modifications described with reference to FIGS. 7 and 9 are applied to the determination of the overflow electric power EP_OVER both when F/C is executed and when F/C is canceled. The actual revolution speed $N_{ICE\_}A$ and the target revolution speed $N_{ICE\_}T$ of the internal combustion engine 2 indicated by two types of dashed lines are for a comparative example. The comparative example shows a case where the fuel cut is not performed.

At a timing T1, the foot is released from the accelerator pedal while the internal combustion engine 2 is being operated at a high output such as a maximum output during high-speed traveling. As a result, the accelerator opening APO begins to decrease, and the torque $TQ_{MG}$ of the travel motor 4 begins to decrease. The accelerator opening APO becomes zero immediately after the timing T1. The torque $TQ_{MG}$ is gradually decreased as the foot is released from the accelerator pedal. When the torque $TQ_{MG}$ decreases, the system receivable electric power EP_SYS decreases accordingly. On the other hand, the intake pressure P does not immediately begin to decrease when the foot is released from the accelerator pedal, and this causes a response delay in the actual torque $TQ_{ICE\_}A$ of the internal combustion engine 2 with respect to the indicated torque $TQ_{ICE\_}T$.

At a timing T2, the intake pressure P is higher than the predetermined value P1. That is, the internal combustion engine 2 is supercharged. Further, at the timing T2, the overflow electric power EP_OVER becomes larger than the determination threshold D1 due to the decrease in the system receivable electric power EP_SYS. As a result, the pre-detection flag is turned ON.

At a timing T3, the F/C flag is turned ON in response to the pre-detection flag turned ON. Therefore, the fuel cut is started and the revolution speed $N_{ICE}$ starts to decrease. From the timing T3, the electric power generated by the electric power generation motor 3 decreases as the revolution speed $N_{ICE}$ decreases, and the system receivable electric power EP_SYS increases accordingly.

At a timing T4, the intake pressure P is lower than the predetermined value P2. That is, the internal combustion engine 2 is not supercharged. Further, at the timing T4, the overflow electric power EP_OVER becomes smaller than the cancel threshold D2 due to an increase in the system receivable electric power EP_SYS. As a result, the F/C unnecessary condition is satisfied and the pre-detection flag is turned OFF.

At a timing T5, the F/C flag is turned OFF if the F/C unnecessary condition is satisfied. Therefore, the electric power generation operation of the internal combustion engine 2 is resumed, and the revolution speed $N_{ICE}$ begins to increase. The system receivable electric power EP_SYS decreases as the revolution speed $N_{ICE}$ increases.

In Comparative Example, the fuel cut is not performed at the timing T3. Therefore, in this case, due to the torque $TQ_{ICE}$ of the internal combustion engine 2 with an amount that cannot be converted into the electric power generated by the electric power generation motor 3, the abrupt increase in the engine revolution occurs.

In the present embodiment, the torque $TQ_{ICE}$ of the internal combustion engine 2 is quickly reduced by performing the fuel cut at the timing T3. As a result, the revolution speed $N_{ICE}$ is also rapidly lowered, and the abrupt increase in the engine revolution is prevented.

Next, main functions and effects of the present embodiment will be described.

A control method for the vehicle 1 includes performing the fuel cut of the internal combustion engine 2 if the overflow electric power EP_OVER exceeds at least the system receivable electric power EP_SYS and the internal combustion engine 2 is supercharged.

According to such a method, the abrupt increase in the engine revolution caused by the response delay of the torque $TQ_{ICE}$ of the internal combustion engine 2 is detected in advance to perform the fuel cut of the internal combustion engine 2, so that the revolution speed $N_{ICE}$ which is to increase can be quickly lowered. Therefore, according to such a method, it is possible to prevent the abrupt increase in the engine revolution in the internal combustion engine 2 provided with the turbocharger 7.

According to such a method, there is no need to provide a mechanism for quickly lowering the boost pressure, and thus, the series hybrid system can be avoided from being complicate. Furthermore, since this method does not limit the boost pressure, when the internal combustion engine 2 is operated at a high output during high-speed traveling, the electric power generated by the electric power generation motor 3 is limited, thereby avoiding a situation where a vehicle driving force is insufficient.

The control method for the vehicle 1 further includes canceling the fuel cut if at least one of a condition that the overflow electric power EP_OVER is less than the system receivable electric power EP_SYS and a condition that the internal combustion engine 2 is not supercharged. According to the former condition, it is possible to resume the electric power generation operation of the internal combustion engine 2 early from a viewpoint of the electric power reception margin. According to the later condition, it is possible to resume the electric power generation operation early from a viewpoint of ensuring the responsiveness of the torque $TQ_{ICE}$ of the internal combustion engine 2. According to both conditions, it is possible to quickly resume the electric power generation operation while ensuring both the electric power reception margin and the responsiveness of the torque $TQ_{ICE}$.

The control method for the vehicle 1 further includes canceling the fuel cut if the vehicle driving force request is present. According to such a method, since the electric power generation operation of the internal combustion engine 2 can be resumed in accordance with the resumption of driving of the travel motor 4, a decrease in the SOC of the battery 5 can be prevented.

In this case, the fuel cut may be canceled when the electric power of the electric power generation motor 3 is required as electric power source of the travel motor 4. Accordingly, when the driving of the travel motor 4 is resumed, the electric power generation operation of the internal combustion engine 2 can be resumed according to the necessity of the resumption of the electric power generation.

The control method for the vehicle 1 further includes calculating the overflow electric power EP_OVER as a sum of magnitude of the inertia torque of the internal combustion engine 2 and magnitude of the friction torque of the internal combustion engine 2. According to such a method, the overflow electric power EP_OVER can be calculated appropriately, and thus, the abrupt increase in the engine revolution can be prevented appropriately.

If the control method for the vehicle 1 is expressed using the torque $TQ_{ICE}$ of the internal combustion engine 2, the control method can be rephrased as follows.

Figure 11:
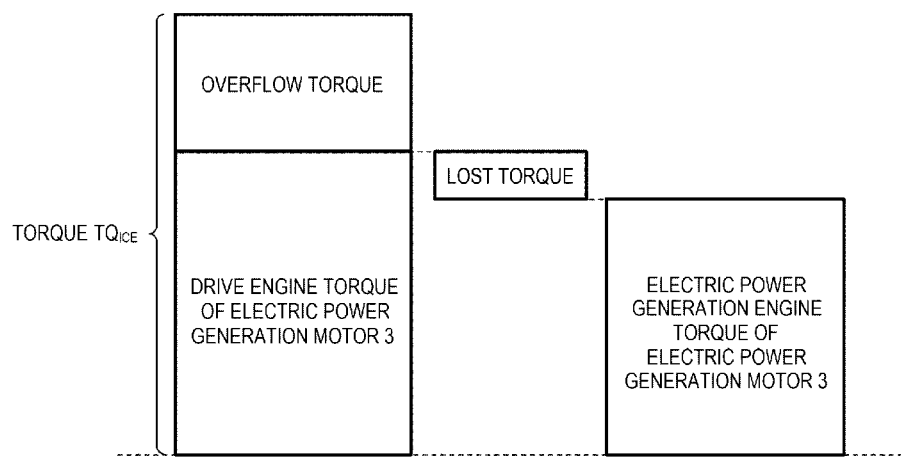
FIG. 11 is an explanatory diagram of an overflow torque of an internal combustion engine.

FIG. 11 is an explanatory diagram of an overflow torque of the internal combustion engine 2. A drive engine torque of the electric power generation motor 3 is the torque $TQ_{ICE}$ that is consumed to drive the electric power generation motor 3, and includes an electric power generation engine torque of the electric power generation motor 3 and a lost torque. The electric power generation engine torque of the electric power generation motor 3 is the torque $TQ_{ICE}$ that is consumed for the electric power generation, and the lost torque is a torque that is lost without being consumed for the electric power generation in the drive engine torque. The torque $TQ_{ICE}$ of the internal combustion engine 2 includes the drive engine torque and the overflow torque. Therefore, the overflow torque becomes the torque $TQ_{ICE}$ with an amount that exceeds the drive engine torque of the electric power generation motor 3. On the other hand, the drive engine torque of the electric power generation motor 3 corresponding to the system receivable electric power EP_SYS indicates the torque $TQ_{ICE}$ that can be converted into the electric power by the electric power generation of the electric power generation motor 3.

Therefore, the control method for the vehicle 1 can be rephrased as a method including performing the fuel cut of the internal combustion engine 2 if the overflow torque exceeds at least the drive engine torque of the electric power generation motor 3 corresponding to the system receivable electric power EP_SYS and the internal combustion engine 2 is supercharged, and can also prevent the abrupt increase in the engine revolution in this case.

Although the embodiments of the present invention have been described above, the embodiments merely exemplify some of application examples of the present invention and do not intend to limit the technical scope of the present invention to the specific configurations of the embodiments.

For example, the internal combustion engine 2 may be provided with a supercharger other than the turbocharger 7. The control method for the vehicle 1 may be implemented by, for example, a single controller.

The invention claimed is:

1. A control method for a series hybrid vehicle which includes a controller configured to perform control, and in which a drive wheel is driven by a travel motor using electric power of an electric power generation motor which is driven by power of an engine with a supercharger to generate the electric power, the control method comprising:
    performing a pre-detection including determining whether overflow electric power is larger than system receivable electric power; and
    subject to results of performing the pre-detection, performing fuel cut of the engine as the control if an excess amount of a torque over a drive engine torque of the electric power generation motor exceeds at least the drive engine torque of the electric power generation motor corresponding to the system receivable electric power indicating an electric power reception margin of a series hybrid system provided in the series hybrid vehicle, and the engine is supercharged.

2. The control method for a series hybrid vehicle according to claim 1, further comprising:
    canceling the fuel cut as the control if a vehicle drive force request is present.

3. The control method for a series hybrid vehicle according to claim 2, further comprising:
    canceling the fuel cut as the control if the electric power of the electric power generation motor is required as an electric power source of the travel motor.

4. The control method for a series hybrid vehicle according to claim 1, wherein performing the pre-detection includes determining whether the engine is supercharged.

5. A control method for a series hybrid vehicle which includes a controller configured to perform control, and in which a drive wheel is driven by a travel motor using electric power of an electric power generation motor which is driven by power of an engine with a supercharger to generate the electric power, the control method comprising:
    performing a pre-detection including determining whether overflow electric power is larger than system receivable electric power; and
    subject to results of performing the pre-detection, performing fuel cut of the engine as the control if magnitude of a difference between a value obtained by converting the power of the engine into the electric power of the electric power generation motor and a value obtained by converting the power of the engine capable of being received by the electric power generation motor into the electric power of the electric power generation motor exceeds at least the system receivable electric power indicating an electric power reception margin of a series hybrid system provided in the series hybrid vehicle, and the engine is supercharged.

6. The control method for a series hybrid vehicle according to claim 5 further comprising:
    canceling the fuel cut as the control if at least one of a condition that the magnitude of the difference falls below at least the system receivable electric power and a condition that the engine is not supercharged is established.

7. The control method for a series hybrid vehicle according to claim 5, further comprising:
    the controller calculating the magnitude of the difference from a sum of magnitude of an inertia torque of the engine and magnitude of a friction torque of the engine.

8. The control method for a series hybrid vehicle according to claim 5, wherein performing the pre-detection includes determining whether the engine is supercharged.

9. A control device for a series hybrid vehicle in which a drive wheel is driven by a travel motor using electric power of an electric power generation motor which is driven by power of an engine with a supercharger to generate the electric power, the control device comprising:
    a pre-detection unit configured to determine whether overflow electric power is larger than system receivable electric power; and
    a control unit in communication with the pre-detection unit and configured to perform fuel cut of the engine if magnitude of a difference between a value obtained by converting the power of the engine into the electric power of the electric power generation motor and a value obtained by converting the power of the engine capable of being received by the electric power generation motor into the electric power of the electric power generation motor exceeds at least the system receivable electric power indicating an electric power reception margin of a series hybrid system provided in the series hybrid vehicle, and the engine is supercharged.

10. The control device for a series hybrid vehicle according to claim 9, wherein the pre-detection unit is configured to determine whether the engine is supercharged.

* * * * *